United States Patent

Bissi et al.

[11] Patent Number: 4,580,850
[45] Date of Patent: Apr. 8, 1986

[54] SAFETY DEVICE FOR A TRACK STRETCHER

[75] Inventors: Maurizio Bissi; Guerrino Baggio; Andrea Cocco, all of Castelfranco Veneto, Italy

[73] Assignee: Simmel S.p.A., Castelfranco Veneto, Italy

[21] Appl. No.: 562,177

[22] Filed: Dec. 16, 1983

[30] Foreign Application Priority Data

Dec. 30, 1982 [IT] Italy ............................... 25051 A/82

[51] Int. Cl.⁴ ..................... B62D 55/16; B62D 55/14
[52] U.S. Cl. ....................................... 305/31; 305/32; 305/10
[58] Field of Search ........................... 305/10, 31, 32; 411/352, 353, 366, 368, 427, 517–519

[56] References Cited

U.S. PATENT DOCUMENTS 1,442,569  1/1923  Holt ....................................... 305/31
3,332,725  7/1967  Reinsma ............................. 305/31 X
3,912,335  10/1975 Fisher ................................. 305/31 X
4,088,377  5/1978  Corrigan ............................ 305/31 X Primary Examiner—David A. Scherbel
Assistant Examiner—Mark J. Abate
Attorney, Agent, or Firm—Amster, Rothstein & Engelberg

[57] ABSTRACT

A safety device for a track stretcher of a tracked vehicle is disclosed. The safety device includes two half rings (14,15) held in a groove (16) of the tension rod (17) of the tracked vehicle by an elastic ring (20). The safety device prevents separation of the tension rod (17) from a support (2) connected to the roller wheel (1) upon failure of the primary thrust controlling stop device which includes a nut (22) screwed on the threaded end (21) of the tension rod (17).

6 Claims, 4 Drawing Figures

SAFETY DEVICE FOR A TRACK STRETCHER

This invention relates to a safety device for track stretchers of track chains on track vehicles of the tractor type, for earth moving and other similar uses.

A track chain of the tractor type consists of a plurality of shoes secured by bolts to track links pivotally connected by means of pins and bushings so as to form an endless track chain. Said track chain in order to operate correctly has to be kept at an adequate stretching level, variable by means of a device of elastic character and not rigid, to be capable of continuously taking up the plays generated because of the wear, with a resultant lengthening of the track chain on the one side, and on the other side to enable to make up for a casual inclusion of foreign bodies (earth, stones, etc.) between the track chain and the rolling and driving parts of the track chain and to allow, if necessary, the disengagement of the track chain from the driving wheel. This requires the use of stretching units referred to as track stretchers, which perform these functions, comprising an elastic member preloaded to a predetermined thrust value (about 50% of the maximum thrust which can be exerted by the group under total compression conditions). This maximum thrust is at least equal to or higher than the operative weight of the machine and as a result the preload can usually reach values as high as 10–20 ton. and higher.

Conventionally the track stretcher unit consists of an idler wheel mounted on the machine by means of supports slidable on guides provided on the frame side members forming the load bearing structure of the machine. Said wheel performs the stretching function on the track chain by utilizing the thrust originated by the compression of the above mentioned preloaded elastic member. The whole rests on the load bearing structure of the machine by means of an adjustable stop (mechanical, hydraulic or of a different character).

The preloaded elastic member consists usually of a big torsion spring disposed between two flanges suitably shaped, parallel to each other and connected by means of a tension rod having a length substantially lower than that of the spring in unloaded condition and threaded at its end a length sufficient to permit to preload the spring until the desired values, by screwing a nut, a ring nut or other similar threaded member.

Under these conditions the preloaded unit runs the risk of violently projecting far away the members it consists of in the case of failure of the thread (stripping of the thread because of manufacture defects, flaws, damage or other accidental event). In such a case the energy released abruptly by the device reaches very high values because of the considerable forces involved and the suddenness of the event. In experiments made in this sense projection speeds of the order of magnitude of 180 km/h (50 m/s) have been found with falling down of the pieces more than 100 m away. As a result, in order to protect from this risk things and especially persons during stays in stores, in earth moving operations, in the track stretcher assembling operations and in the mounting of the track stretchers on the machines as well as in the subsequent servicing, different additional safety devices have been suggested which face the problem more or less brilliantly.

These additional safety devices, however, are also based on threaded connections whereby they certainly reduce the risk intrinsically existing in a threaded connection, but do not eliminate it completely. For example a further tubular telescopic tension rod has been provided which is screwed to the two flanges and is mounted coaxially to the conventional tension rod, or in another case a long screw has been provided coaxially to the conventional tension rod which is on purpose thickened and shaped, which screw engages the tension rod upstream the primary locking threads thus acting as an emergency tension rod.

It is an object of this invention to obviate the disadvantage of the prior art safety devices by eliminating the threaded connection as a safety member.

More particularly, it is an object of the invention a safety device for a track stretcher unit comprising a tension rod intended to take up the thrust of a preloaded spring acting through a flange on the support of a track stretcher wheel, said tension rod being provided with a thread cooperating with a threaded stop member for the flange, characterized in that it consists of two or more bars received in a groove provided in the tension rod up stream the thread, said bars having such a thickness that they project from the groove with respect to the cylindrical face of the tension rod so as to provide a stop abutment for the flange in the case of a failure of the threaded connection between the tension rod and the stop member.

Because of the presence of this safety device, should the threaded connection between the tension rod and the stop member screwed on it fail, the bars projecting from the tension rod would prevent a withdrawal from the tension rod of the portion of the track stretcher normally locked on the tension rod of the stop member. In other words the auxiliary stop device consisting of the bars received in the grooves of the tension bar would substitute itself for the primary stop device thus avoiding the above mentioned disadvantage.

The invention will be better understood from the following description, given merely as an example and therefore in no limiting sense, of an embodiment thereof, referring to the accompanying drawings in which.

Figure 1:
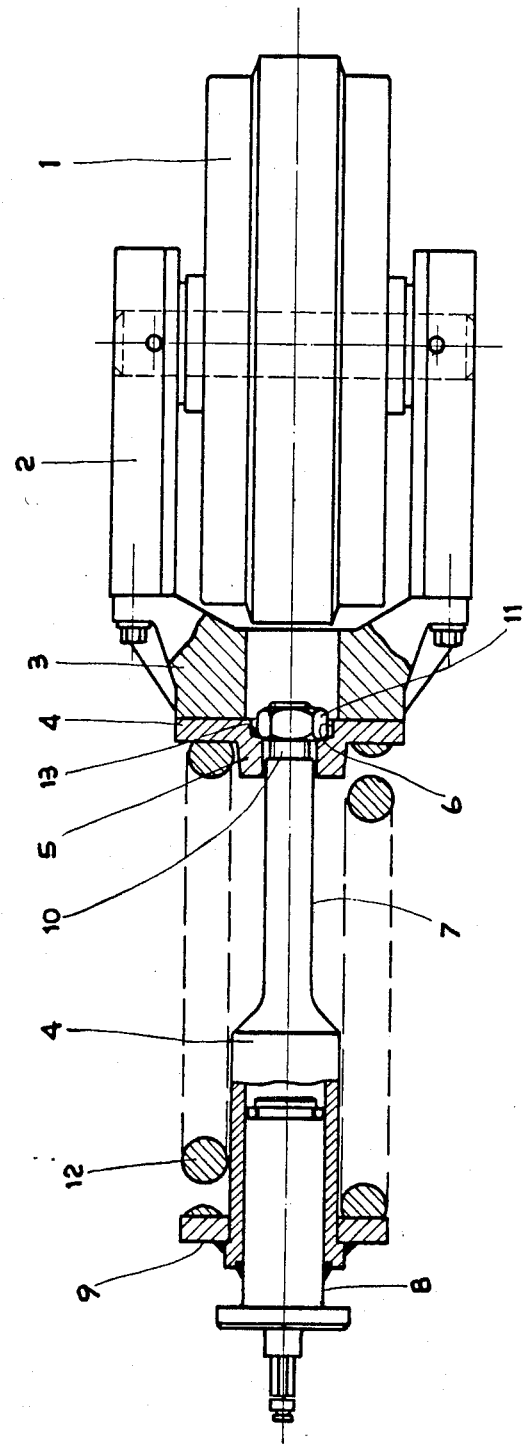
FIG. 1 is a top plan view, partially in cross-section, of a conventional track stretcher unit.

Referring first to FIG. 1, a conventional track stretcher unit comprises an idler wheel 1 mounted on slidable supports 2 connected by means of a connection and extension member 3 to a flange 4 integral with a hub 5 and having a counterbore 6 on the side opposite to the hub. A tension rod 7 is connected to the weight bearing structure of the machine, not shown, through an adjustable hydraulic stop device 8. This tension rod carries at one end a flange 9 and at the opposite end a thread 10 on which a nut 11 is screwed. A preloaded helical spring 12 is disposed between the flange 4 and 9 and constantly urges the abutment 13 of the counterbore 6 in engagement with the nut 11 acting as a stop.

It is apparent that should in a track stretcher unit like that described for any reason fail the theaded connection between the nut 11 and the tension rod 7, the idler wheel assembly would be withdrawn under the thrust of the spring 12 from the tension rod and would be violently projected far away.

Figure 2:
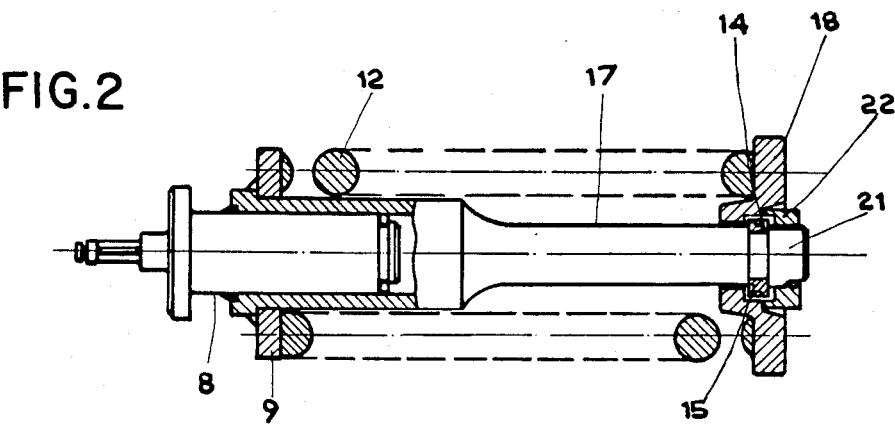
FIG. 2 is a view, partially in axial cross-section, to a reduced scale with respect to that of FIG. 1, of the portion of the track stretcher unit of interest for the present invention which is provided with a safety device according to the invention.
Figure 3:
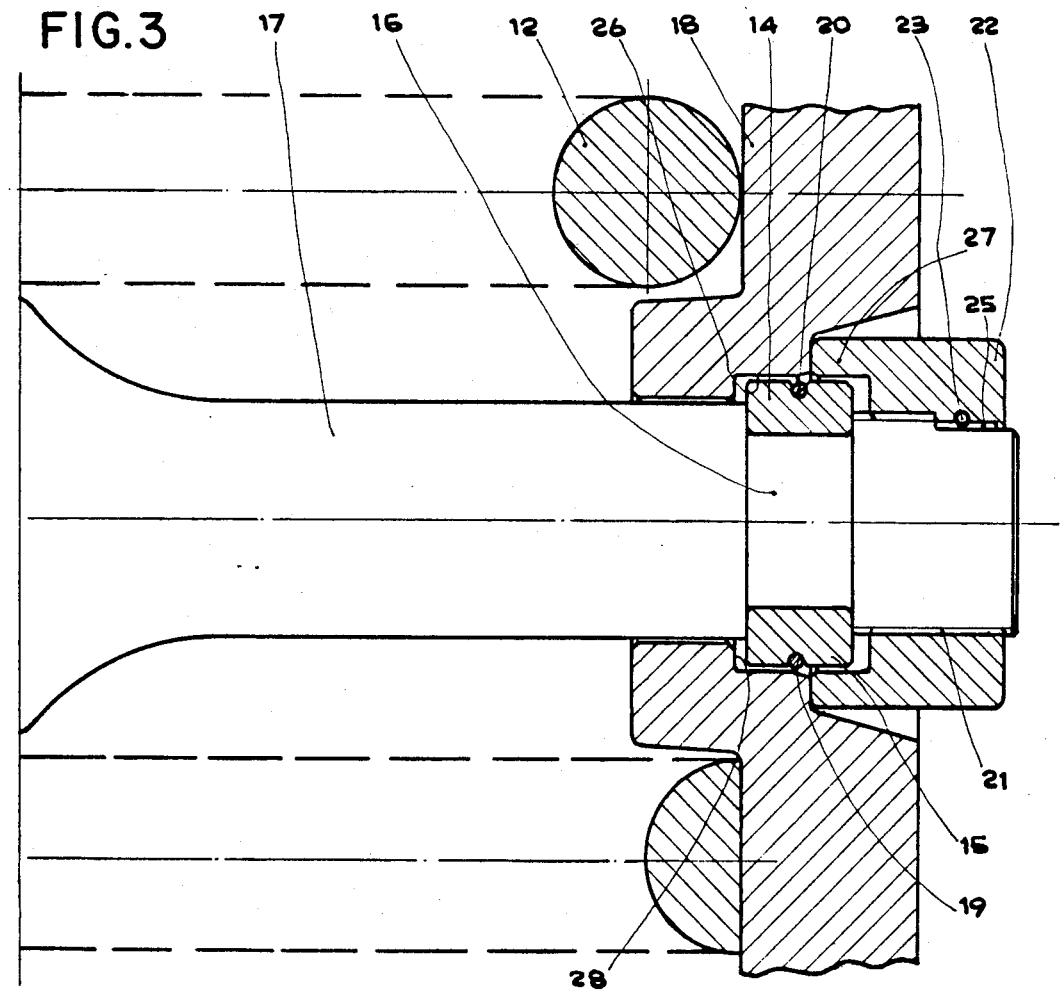
FIG. 3 is an enlarged cross-section of the portion of FIG. 2 comprising the safety device according to the invention.
Figure 4:
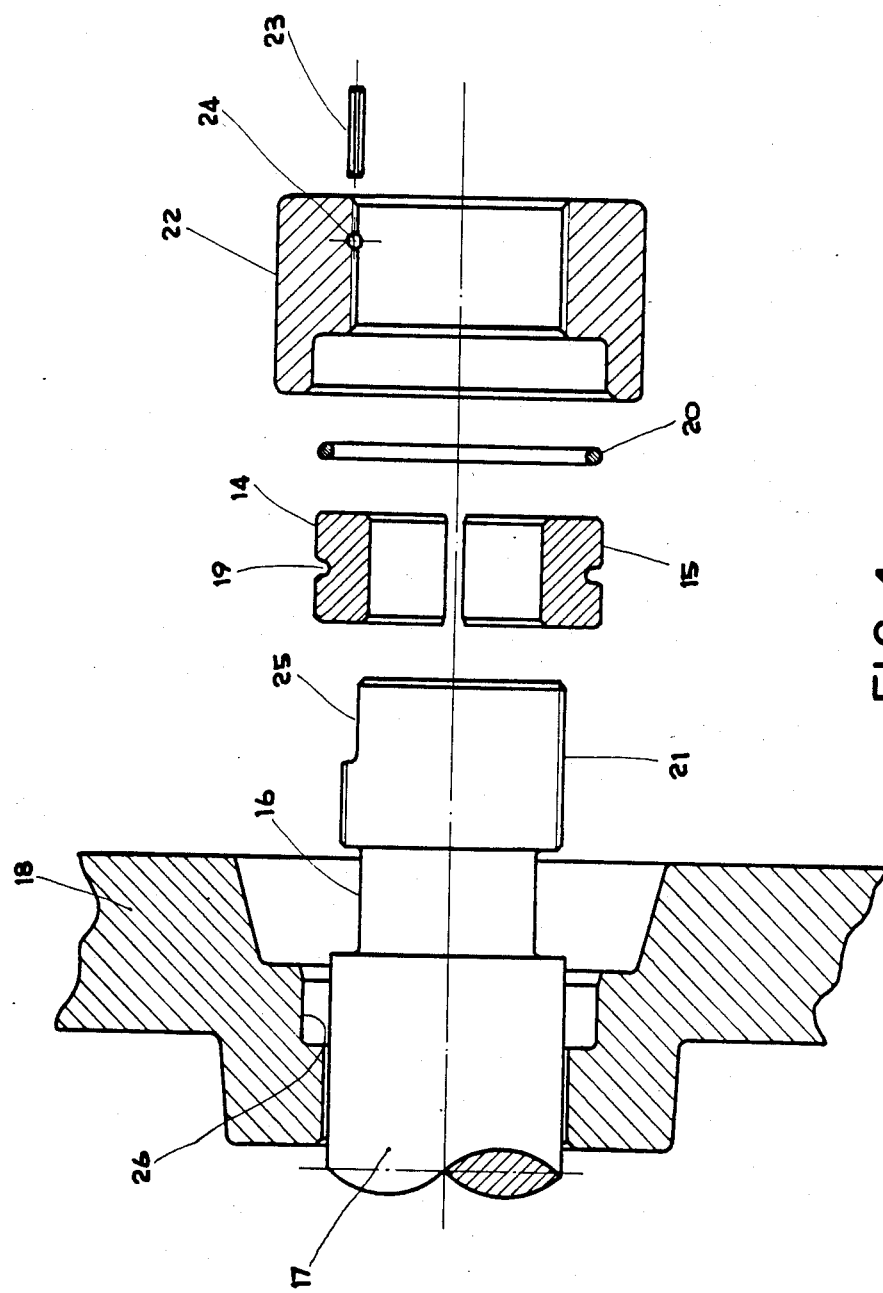
FIG. 4 shows in axial cross-section the components of the safety device according to the invention in a disassembled condition.

In FIGS. 2 to 4 a safety device according to the invention is shown which obviates said disadvantage. For the sake of clarity the same reference numerals of FIG. 1 have been kept in said figures only for the parts which are the same as those of FIG. 1.

The safety device is shown as it is in a normal condition when the spring is in a preloaded condition. It consists of two curved bars 14,15 having a substantially rectangular cross-section which are received in a groove 16 provided in the tension rod 17 and have such a thickness that they project about a half with respect to the diameter of the tension rod in the sliding area of the tension rod through the flange 18. Obviously, while in the described example the bars are two, they could be also more in number.

The set of curved bars must in any case form, once they are assembled, a composite ring which embraces the tension rod and mates the inner bottom surface of the groove 16. Provided in the outer surface of each bar is a longitudinal groove 19 having a suitable shape and dimension and being disposed so as to provide, once the composite ring is formed by inserting the bars in the groove 16 of the tension rod 17, a seat adapted to receive an elastic ring 20. The function of the latter is to keep the bars united by pressing them against the bottom of the groove 16 and causing them to mate said bottom.

The tension rod 17 has, as usual, the free end threaded at 21 to receive the stop member in the form of an inside threaded bushing 22. A small diameter elastic pin 23 is forced transversely at 24 in the threaded member 22 so as to be parallel to a planished area 25 provided in the end portion of the thread 21 of the tension rod 17 and nearly abutting said threaded portion to prevent unscrewing of the threaded member 22 from the tension rod 17. This is anyway a known measure which could be replaced by other also known anti-unscrewing devices.

Reverting to the safety device according to the invention it should be noted that the groove 16, whose surface close to the threaded area 21 of the tension rod 17 must take up the axial force developed by the spring 2 in the case of failure of the thread, must be dimensioned, in terms of depth, within such limits as not to jeopardize the tensile strength of the tension rod 17 referred to the preload value of the spring, at which the residual core (minimum cross-section) must anyway assure the mechanical strength of the tension rod in the case of a sudden failure of the primary locking. The diametral dimensioning of the groove 16 is therefore such as to safeguard both requirements, of a sufficient lateral abutment and adequate tensil strength in dependence on possible forces depending on the preload value imposed to the spring 12. The transversal dimensioning (parallel to the tension rod axis) is also dependent on the preload value since it depends on the resistance to shearing stress of the curved bars.

26 designates a counterbore having a suitably chosen diameter and depth provided in the flange 18 and facing the threaded end 21 of the tension rod 17. The diameter of the counterbore 26 must be such as to allow the free movement in an axial direction of the flange 18 with respect to the composite ring (consisting of the curved bars 14,15 inserted in the groove 16 and kept in their seat by the elastic ring 20) without, however, allowing the bars 14,15 to go out of the groove 16 in a radial direction even in the absence of the elastic ring 20.

Coming now to the analysis of the described safety device under working conditions, it can be observed that the primary locking function is performed by the threaded member 22, whereas the safety device is in no way engaged. When a shifting from the preloading position occurs, as can normally occur during working because of the backward sliding of the flange 18 which further compresses the spring 12, no tensile stress is applied to the tension rod 17 or the threaded member 22 engaged thereon and not even to the safety device. Also in this situation, because of the particular shaping of the threaded member 22 which has a thinner annular section 27 covering the curved bars 14,15, the outer covering of the bars along the portion of their axial length is maintained and the guaranty is also maintained that the curved bars 14,15 are kept in their seat in the groove 16. It is, therefore, seen that, as long as the primary stop device performs its function, strictly speaking there would be not even need of the elastic ring 20 to hold the curved bars 14,15 in their seat. Its presence is, however, suitable in the case the primary stop fails because of failure or stripping of the thread.

In an event of this kind the spring 12 urges the flange 18 until the abutment 28 of the counterbore 26 abuts the bars 14,15 which take now up the stop function in the place of the threaded member 22. It might occur that, as the machine continues to operate after this new situation, the flange 18 is urged backwards against the spring to such extent as to keep the outer surface of the bars 14,15 completely free. Under these conditions, in the absence of the elastic ring 20, the bars 14,15 could be withdrawn from the groove 16. This is why it is suitable to assure its permanence in seat by means of the elastic ring 20.

While but one embodiment of the invention has been illustrated and described, it is obvious that a number of changes and modifications can be made without departing from the scope of the invention.

We claim:

1. In a track stretcher for a tracked vehicle, a safety device, the track stretcher comprising a support having a flange, an idler wheel rotatably coupled to the support and adapted to engage a track of the tracked vehicle, a tension rod slidably coupled at one end to the support and adapted to be coupled at another end to the vehicle, a spring acting on the support flange and the tension rod to urge the tension rod away from the flange, and cooperating stop means associated with the tension rod and the flange to prevent separation of the tension rod from the support, the safety device comprising a groove in the tension rod, at least one member received by the groove and projecting outwardly of the groove, and an abutment in the flange which engages the member and prevents separation of the tension rod from the flange when the stop means fail.

2. A device as claimed in claim 1 wherein the tension rod has a cylindrical face adjacent the groove, and comprising a plurality of said projecting members in the form of bars, said bars having a thickness such that they project from the groove with respect to the cylindrical face of the tension rod so as to provide said stop means.

3. A device as claimed in claim 2 wherein the bars each have an inner surface and the groove has a bottom surface, and the bars mate with their inner surface on the bottom surface of the groove.

4. A device as claimed in claim 2 wherein the tension rod is provided with a thread adjacent the groove and the flange is provided with a threaded stop member to which the tension rod is threaded to couple the tension rod to the support, and wherein the threaded stop member cooperating with the thread of the tension rod has an annular extension covering, at least partially, the outer surface of the bars.

5. A device as claimed in claim 3 comprising an elastic ring disposed about the bars holding them in contact with the bottom surface of the groove.

6. A device as claimed in claim 5 wherein the bars have a curved outer surface, and a longitudinal groove is provided in the outer curved surface of the bars in which the elastic ring is received.

* * * * *